United States Patent
Cho et al.

(10) Patent No.: US 9,173,057 B2
(45) Date of Patent: Oct. 27, 2015

(54) APPARATUS AND METHOD OF MANAGING PERIPHERAL WIRELESS LAN RADIO SIGNAL FOR POSITIONING SERVICE

(71) Applicants: Chae Hwan Cho, Gwacheon Si Gyeonggi-Do (KR); Suk Yon Kang, Seoul (KR); Song Man Lee, Icheon Si Gyeonggi-Do (KR); Ji Min Kim, Goyang Si Gyeonggi-Do (KR); Chun Young Kim, Seoul (KR)

(72) Inventors: Chae Hwan Cho, Gwacheon Si Gyeonggi-Do (KR); Suk Yon Kang, Seoul (KR); Song Man Lee, Icheon Si Gyeonggi-Do (KR); Ji Min Kim, Goyang Si Gyeonggi-Do (KR); Chun Young Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 100 days.

(21) Appl. No.: 13/867,825

(22) Filed: Apr. 22, 2013

(65) Prior Publication Data
US 2013/0235863 A1 Sep. 12, 2013

Related U.S. Application Data

(63) Continuation of application No. PCT/KR2011/007725, filed on Oct. 18, 2011.

(30) Foreign Application Priority Data

Oct. 20, 2010 (KR) .................. 10-2010-0102253

(51) Int. Cl.
H04W 4/02 (2009.01)
H04W 64/00 (2009.01)
G01S 5/02 (2010.01)
H04W 48/16 (2009.01)

(52) U.S. Cl.
CPC ............... *H04W 4/02* (2013.01); *G01S 5/0252* (2013.01); *H04W 64/00* (2013.01); *H04W 48/16* (2013.01)

(58) Field of Classification Search
None
See application file for complete search history.

(56) References Cited

U.S. PATENT DOCUMENTS 7,433,696 B2 * 10/2008 Dietrich et al. ............ 455/456.2
8,314,736 B2 * 11/2012 Moshfeghi .................. 342/465
8,787,228 B2 * 7/2014 Avital et al. ................. 370/311

(Continued)

FOREIGN PATENT DOCUMENTS

CN 101668293 A 3/2010
KR 1020060104175 10/2006
KR 1020090043733 5/2009

OTHER PUBLICATIONS

International Search Report for PCT/KR2011/007725.
(Continued)

*Primary Examiner* — Huy D Vu
*Assistant Examiner* — Hong Shao
(74) *Attorney, Agent, or Firm* — Hauptman Ham, LLP

(57) ABSTRACT

The present disclosure relates to providing a positioning service by managing a plurality of peripheral wireless LAN signals. The positioning service system collects peripheral wireless LAN radio signals by scanning peripheral access points (APs), stores AP information of each of peripheral wireless LAN radio signals in each lattice cell of a database. When a positioning request signal is received from a terminal, a positioning server of the positioning service extracts AP identification information from included in the peripheral wireless LAN radio signal received from the terminal. By using the extracted AP identification information, the positioning server selects from the database the corresponding lattice cell matching to the stored AP identification information of each of the peripheral wireless LAN radio signals pre-stored. And the positioning server estimates location information of the selected corresponding lattice cell as location information for the terminal.

17 Claims, 7 Drawing Sheets

(56) References Cited

U.S. PATENT DOCUMENTS

2001/0023446 A1* 9/2001 Balogh .................. 709/229
2007/0147317 A1* 6/2007 Smith et al. ................ 370/338

2008/0008121 A1 1/2008 Alizadeh-Shabdiz

OTHER PUBLICATIONS

Chinese Office Action dated Jul. 3, 2015.

* cited by examiner

APPARATUS AND METHOD OF MANAGING PERIPHERAL WIRELESS LAN RADIO SIGNAL FOR POSITIONING SERVICE

CROSS-REFERENCE TO RELATED APPLICATION

The present application is a continuation of International Application No. PCT/KR2011/007725 filed Oct. 18, 2011, which is based on, and claims priority from, KR Application Serial Numbers 10-2010-0102253, filed on Oct. 20, 2010. The disclosures of the above-listed applications are hereby incorporated by reference herein in their entirety.

FIELD

The present disclosure relates to providing a positioning service by managing a plurality of peripheral wireless LAN signals.

BACKGROUND

The statements in this section merely provide background information related to the present disclosure and may not constitute prior art.

As computer, electronic, and communication technologies are rapidly developed, various wireless communication services using a wireless network are provided. The services provided by a mobile communication system using the wireless network are evolving into a multimedia service such as transmitting circuit data, packet data and the like on top of the voice data.

In particularly, a Location Based Service (LBS) among various wireless Internet services using a mobile communication terminal is under spotlight due to its wide usability and convenience. The location based service generally refers to a communication service for detecting a location of the mobile communication terminal such as a mobile phone, a personal digital assistant (PDA) and the like, and providing additional information related to the detected location. A location measurement technology for use in the location based service may be classified into a network-based mode for identifying a location by way of software using a radio environment corresponding to a cell coverage of a base station of a communication network, a handset-based mode using a global positioning system (GPS) receiver installed in the mobile communication terminal, and a hybrid mode in which the above two schemes are both used.

SUMMARY

In accordance with some embodiments, the positioning service system is configured to provide a positioning service by managing one or more wireless local area network (LAN) radio signals from one or more peripheral access points (APs). The positioning service system comprises an AP managing device, a positioning server and a specific AP (so called, a service provider AP). The AP managing device is configured to receive one or more peripheral radio signals, identify whether there is a lattice cell including AP identification information corresponding to a parameter of each of the received peripheral signals and store in a database the AP identification information of each of the received peripheral radio signals for each of lattice cells if there is the lattice cell including the AP identification information as a result of the identification. The positioning server is configured to receive a positioning request signal including at least one radio signal from a terminal, extract AP identification information from the at least one radio signal from the terminal, select from the database a corresponding lattice cell matching to the extracted AP identification information, and estimate location information of the selected lattice cell as the location information for the location on which the terminal camps. The specific AP is configured to transmit the one or more peripheral radio signals to the AP managing device, receive a scan request signal from the AP managing device, scan the one or more peripheral radio signals from the one or more peripheral APs, and transmit the scanned one or more peripheral radio signals to the AP managing device in response to the scan request signal.

In accordance with some embodiments, the device for managing one or more access points (APs) to provide a positioning service comprises an information receiver, an additional storage unit and an information request unit. The information receiver is configured to receive one or more peripheral radio signals from a specific AP. The additional storage unit is configured store AP identification information of each of the one or more peripheral radio signals for each of the lattice cells in a database. And the information request unit is configured to transmit a scanning request signal to the specific AP and receive the one or more peripheral radio signals through the information receiver in response to the scanning request signal.

In accordance with some embodiments, the positioning service system is configured to manage one or more peripheral signals from one or more peripheral access points (APs) and thereby provide a positioning service to one or more terminals. The AP managing device of the positioning service system is configured to receive one or more peripheral radio signals scanned from one or more peripheral access points (APs), and store AP identification information of each of the received peripheral radio signals for each of lattice cells in a database. The AP managing device is configured to identify whether a positioning request signal is received from the terminal. The positioning server of the positioning service system is configured to extract AP identification information included in peripheral radio signal received from the terminal when the positioning request signal is received from the terminal and, by using the extracted AP identification information, select from the database a corresponding lattice cell matching to the stored AP identification information of each of peripheral radio signals. The positioning server of the positioning service system is configured to estimate location information of the selected corresponding lattice cell as location information for the location on which the terminal is currently camping.

In accordance with some embodiments, to provides a positioning service, the access managing device.

DETAILED DESCRIPTION

Figure 1:
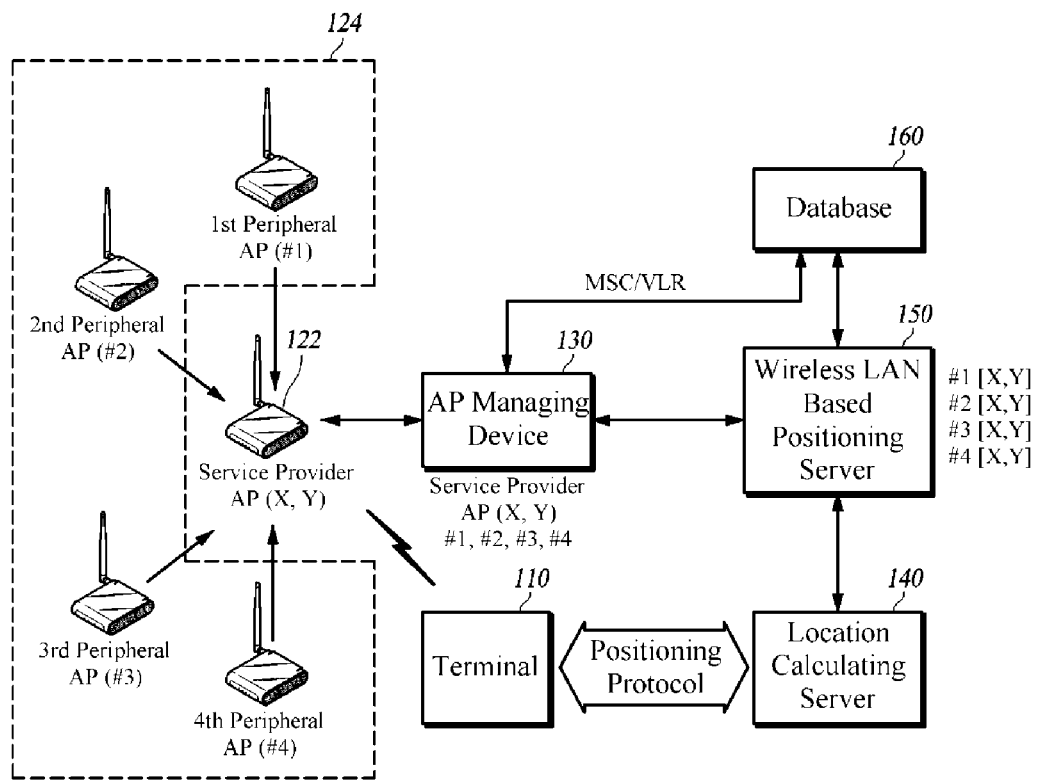
FIG. 1 is a block diagram of a system for providing a positioning service by managing a peripheral wireless LAN signals according to at least one embodiment.

At least one embodiment of the present disclosure provides managing one or more peripheral wireless local area network (LAN) signals which collects the one or more peripheral wireless LAN radio signals by using a scanning function performed by a service provider access point (AP) and then stores the collected peripheral wireless LAN radio signals to use the stored peripheral wireless LAN radio signals in measuring a location and/or providing a positioning service.

Hereinafter, various embodiments of the present disclosure will be described in detail with reference to the accompanying drawings. In the following description, like reference numerals designate like elements although they are shown in different drawings. Further, in the following description of some embodiments, a detailed description of known functions and configurations incorporated herein will be omitted for the purpose of clarity.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

FIG. 1 is a block diagram of a system for providing a positioning service by managing peripheral wireless LAN signals according to at least one embodiment.

A system for providing a positioning service by managing peripheral wireless LAN signals according to at least one embodiment is configured to include at least one of a terminal 110, a service provider AP 122, peripheral APs 124, an AP managing device 130, a location calculating server 140, a wireless LAN based positioning server 150, and a database 160. Of course, although it is described that the system includes only the terminal 110, the service provider AP 122, the peripheral APs 124, the AP managing device 130, the location calculating server 140, the wireless LAN based positioning server 150, and the database 160 in at least one embodiment of the present disclosure, it is only for an exemplary illustrative description of the technical idea according to at least one embodiment of the present disclosure and those skilled in the art can variously change and modify the components included in the system of providing a positioning service by managing the peripheral wireless LAN signals and then apply the changed and modified components, without departing from the scope of the present disclosure.

The terminal 110 is a terminal equipped with a communication module configured to perform general voice phone communication and data communication, and is configured to perform the general voice phone communication and data communication while interworking with a communication network (not shown) by using the equipped communication module. Meanwhile, the terminal 110 is configured to transmit information on a base station of the interworking communication network to the location calculating server 140. The terminal 110 refers to a terminal which accesses an internet network through a recognized peripheral access point (AP) by using the equipped wireless LAN module to receive various types of data. Meanwhile, the terminal 110 may include a GPS module, but the present disclosure is not necessarily limited thereto. The terminal 110 equipped with the GPS module is configured to extract navigation data (i.e., positioning data) from GPS radio signals received from one or more GPS satellites by using the GPS module and transmit the extracted navigation data to the location calculating server 140 through the communication network. That is, the terminal 110 can be configured to include one or more modules of the communication module and the wireless LAN module, and may be one of a mobile communication terminal, a smart phone, a personal computer (PC), a notebook, a personal digital assistant (PDA) and the like. Further, the terminal 110 refers to a terminal including a memory for storing an application to use the location based service, a microprocessor for executing a software or computer program to perform an operation and a control and the like.

Meanwhile, the terminal 110 may include an independent database (or storage, or dedicated memory) for storing each lattice cell distinguished by each cell ID, wherein each lattice cell is matched with a certain wireless LAN radio signal and then stored therein. Further, the terminal 110 receives one or more peripheral wireless LAN radio signals from the service provider AP 122, and may store a parameter of each of the one or more peripheral wireless LAN radio signals for each of lattice cells including AP identification information corresponding to the parameter of each of the peripheral wireless LAN radio signals as reference location information (or a reference position).

A positioning protocol refers to a protocol standardizing a standard of an application layer for measuring a location. Any positioning protocol can be used as long as signal transmission/reception between the terminal 110 and the location calculating server 140 is possible. An Interim Standard-801 (IS-801), a Radio Resource Location Services Protocol (RRLP), an Radio Resource Control (RRC), a Secure User Plane Location (SUPL) and the like may be used as the positioning protocol. Meanwhile, a GPS signal may be exchanged between the terminal 110 and the location calculating server 140 by using a Secure User Plane Location (SUPL) 2.0 as the positioning protocol, but the present disclosure is not necessarily limited thereto. Here, the SUPL corresponds to a mode of avoiding communication between respective network nodes which is required when a conventional location positioning procedure is performed, in providing the positioning. The SUPL is a protocol for allowing data related to the positioning to be directly exchanged through a data transmission path between the terminal 110 and the location calculating server 140, and thus costs spent on implementing the nodes required for the positioning may be reduced and a more accurate positioning service may be provided. Meanwhile, when the SUPL 2.0 is used, the terminal 110 can measure a Round Trip Delay (RTD) by using the SUPL 2.0.

The service provider AP 122 according to at least one embodiment is an AP installed by a communication service provider, and refers to a device for scanning the peripheral APs 124, receiving peripheral wireless LAN radio signals of the scanned peripheral APs, and transmitting the received peripheral wireless LAN radio signals to the AP managing device 130 as well as basically connecting data communication with one or more terminals. Here, each peripheral wireless LAN radio signal includes one or more of a Basic Service Set Identifier (BSSID) which is a MAC address of a corresponding AP, a Service Set Identifier (SSID), and AP channel information. That is, the service provider AP 122 is a device for connecting data communication with peripheral APs and one or more terminals, and is configured to by extract (or determine) a communication path for received data packet by reading an address of a reception side from information of a transmission side included in the received data packet, whereby the service provider AP 122 designates a most suitable communication path for the data packet, and then performs transmitting the data packet to another communication network. That is, the service provider AP 122 can extract destination information from the data packet, designate (or determine, or select) at least one communication path suitable for the data packet based on the extracted destination information, and transmit the data packet to a next device through the designated communication path, and can alternatively share several lines (or channels) in a network environment. In at least one embodiment, the service provider 122 may is configured to act as a router, a repeater, a relay station, and a bridge. The service provider AP 122 according to at least one embodiment of the present disclosure is configured to scan at least one peripheral AP such as the peripheral APs 124 on a regular cycle and receive the corresponding peripheral wireless LAN radio signals from each of the scanned peripheral APs 124, and transmit the received peripheral wireless LAN radio signals to the AP managing device 130. Further, when the service provider AP 122 receives a scan request signal from the AP managing device 130, the service provider AP 122 is configured to scan the peripheral APs 124. Each of the peripheral AP 124 is a device capable of exchanging the data packet between the terminal 110 and external servers. Each of the peripheral AP 124 can extract destination information from the data packet, designate (or determine, or select) at least one communication path suitable for the data packet on the basis of the extracted destination information, and transmit the data packet to a next device through the designated communication path, or can share several lines in a general network environment.

The AP managing device 130 according to at least one embodiment may include a database 160 for storing each lattice cell distinguished by each cell ID, wherein each lattice cell is matched with a wireless LAN radio signal, and then stored. Further, the AP managing device 130 receives one or more peripheral wireless LAN radio signals from the service provider AP 122, and stores a parameter of each of the one or more peripheral wireless LAN radio signals for each of lattice cells including AP identification information corresponding to the parameter of each of the peripheral wireless LAN radio signals as reference location information. Moreover, the AP managing device 130 is configured to transmit a scan request signal to the service provider AP 122, and in response to the scan request signal, receive the one or more peripheral wireless LAN radio signals corresponding to the peripheral APs 124 from the service provider AP 122. The AP managing device 130 is also configured to transmit the scanning request signal to the service provider AP 122 on a preset regular cycle. The AP managing device 130 is configured to store the corresponding parameter included in each of the peripheral wireless LAN radio signals in the database immediately upon receiving the peripheral wireless LAN radio signal, or stores the parameter included in the peripheral wireless LAN radio signal in the database on a preset regular cycle. Here, the parameter of each of the peripheral wireless LAN radio signals indicates AP identification information corresponding to the parameter of each of the peripheral wireless LAN radio signals. Other components as well as modules and components described above of the terminal are implemented by one or more processors and/or application-specific integrated circuits (ASICs) as describe herein For example, as illustrated in FIG. 1, the AP managing device 130 is configured to receive peripheral wireless LAN radio signals from a plurality of peripheral APs, such as, for example, a first peripheral AP #1, a second peripheral AP #2, a third peripheral AP #3, and a fourth peripheral AP #4 which are the peripheral APs 124. Upon receiving the peripheral wireless LAN radio signals, the AP managing device 130 is configured to match respective identification information (i.e., identification information #1, #2, #3 and #4) of each peripheral AP with a latitude and longitude coordinate value (X', Y') in such a manner that the corresponding coordinated value (X', Y') of each peripheral AP is set (or calculated) by the AP managing device 130 by using an latitude and longitude coordinate value (X,Y) (i.e., location information) of the service provider AP 122 as a reference location information (or reference point). And the AP managing device 130 is configured to store the set location information of each peripheral AP in the database 160. Here, the latitude and longitude coordinate value (X, Y) is the location information of the service provider AP 122, acting as a reference point for setting location information of each peripheral AP, and is pre-stored in the database 160.

The location calculating server 140 is configured to receive satellite information through a self-constructed satellite reception device and perform a positioning by using the satellite data received from the terminal 110, when the terminal send a request of the positioning to the location calculating server 140. That is, the location calculating server 140 is configured to receive navigation data (or positioning data) from the terminal 110 and perform calculating the latitude and longitude coordinate value (i.e., location information) where the terminal 110 currently camps on. Moreover, when the location calculating server 140 selectively receives location information from the terminal 110 according to the need, the location calculating server 140 is configured to perform transmitting the location information to a Location Based Service Platform (LBSP). The location calculating server 140 can be configured to transfer latitude and longitude data corresponding to positioning result data and Pilot Phase Measurement (hereinafter, referred to as "PPM") data received from the terminal 110 to a server for pCell positioning. The location calculating server 140 is configured to receive a positioning request signal (or location request) from the LBSP (not shown), and transmit to an HLR a Short Message Request (SMREQ) signal for requesting information on a terminal corresponding to a positioning target. In response, the location calculating server 140 is configured to receive from the corresponding HLR a Short Message Request (SM-REQ) signal containing a response to the request for the information on the terminal corresponding to the positioning target. The location calculating server 140 is configured to interwork with the terminal 110 to measure the location of the terminal 110, and then can transmit a positioning response signal (or location result) containing a positioning result to the LBSP.

Meanwhile, the location calculating server 140 includes a Position Determination Entity (hereinafter, referred to as a "PDE") applied to a synchronous Code Division Multiple Access (CDMA) system, a Position Server (PS) applied to an asynchronous Wideband Code Division Multiple Access (W-CDMA) system, and a Serving Mobile Location Center (SMLC) applied to a Global System for Mobile communication (GSM) system, but the present disclosure is not necessarily limited thereto. The PDE can execute a location measuring function using a satellite and a network type location measuring function using a triangulation method in the CDMA. Further, the PS can execute the location measuring function using the satellite and a basic cell type location measuring function in the W-CDMA, and the SMLC can execute the location measuring function using the satellite and the cell type location measuring function in the GSM.

Meanwhile, the above-mentioned PPM data contains system information measured by the terminal 110 and time and distance information of an adjacent base station. Here, basic data collected by the terminal 110 includes information on a system which is currently serviced, a pilot signal of the adjacent base station, signal intensity and the like. The information on the system which is currently serviced contains a system ID (hereinafter, referred to as an "SID"), a network ID (hereinafter, referred to as an "NID"), a base station ID (hereinafter, referred to as a "BSID"), a sector number of the base station which is currently serviced (Reference PN, hereinafter, referred to as "Ref_PN"), a pilot phase within the Ref_PN, a signal intensity and the like. Further, the pilot signal of the adjacent base station contains a sector number of the adjacent base station (measurement PN) collected from the mobile terminal 110, a pilot phase within the sector number of each adjacent base station, distance data and time data such as signal intensity. The above-mentioned PPM data is positioning related data in the CDMA system, and may be System Frame Number (SFN)-SFN observed time difference or UE RX-TX time difference data in the W-CDMA, but may be positioning related data used in other all communication systems, not limited thereto.

Meanwhile, although it has been described that the location calculating server 140 is applied to the CDMA and the WCDMA to provide the pCell positioning, it is only for an illustrative description of the technical idea of the present disclosure, and those skilled in the art can make a modification such that the location calculation server 140 is applied to Long Term Evolution (LTE) and Evolved Packet Core (EPC) to provide the pCell positioning and then apply the modification, without departing from the scope of the present disclosure.

The wireless LAN based positioning server 150 is configured to measure a location of the target terminal 110 by using the database 160 for wireless LAN based positioning. When the wireless LAN based positioning server 150 receives from the terminal 110 a positioning request signal, including the wireless LAN signal corresponding to a certain peripheral AP, via the location calculation server 140, the wireless LAN based positioning server 150 is configured to select from the database 160 a lattice cell (pCell) having a pattern closely matching with the received wireless LAN signal included in the positioning request, and can provide a service requester (i.e., the terminal 110) with information about the selected lattice cell as a positioning result. That is, the wireless LAN based positioning server 150 is configured to identify AP identification information (i.e., AP identification from the terminal 100) included in the wireless LAN signal received from the terminal 110, and select from the database 160 a lattice cell corresponding to the same AP identification information pre stored in the database 160 as or matching to the AP identification information (i.e., AP identification from the terminal 100) included in the wireless LAN signal received from the terminal 110. And if the wireless LAN based positioning server 150 searches (or determines) AP identification information, pre stored in the database 160, matching to the AP identification information from the terminal 110, the wireless LAN based positioning server 150 provides the terminal 110 with information about the selected lattice cell as a positioning result. Here, the wireless LAN based positioning server 150 can measure the location of the terminal 110 by using one or more of information on a physical or logical distance between peripheral APs, information on a reception signal intensity of the wireless LAN signal, deviation value information, level information, and a score according to the deviation information.

Further, the wireless LAN based positioning server 150 selects lattice cells corresponding to the peripheral AP identification information included in the wireless LAN information received from the terminal 110 by searching or retrieving the database 160, and compares information matched with the selected lattice cells with pre-stored information by using the information pre-stored in the database 160 to thereby calculate a physical or logical distance between peripheral APs. When the calculated physical or logical distance exceeds a preset distance, the lattice cell including the corresponding AP identification information may be excluded from the positioning target by the wireless LAN based positioning server 150. Alternatively, the wireless LAN based positioning server 150 is configured to assign weight differently applied in an order of the reception signal intensity to each AP identification information included in the selected lattice cells, and can determine the position of the terminal 110 by using a final value generated by weighted sum.

The wireless LAN based positioning server 150 according to at least one embodiment is configured to receive one or more signals of a positioning request signal and at least one wireless LAN radio signal from the terminal 110, extract AP identification information from one or more parameters included in the wireless LAN radio signal, select from the database 160 a corresponding lattice cell including the extracted AP identification information which is matched to location information (reference location information) of the service provider AP 122, and determine (or identify) location information of the selected lattice cell as the location information of the terminal 110. For example, as illustrated in FIG. 1, when the AP identification information included in the wireless LAN radio signal received from the terminal 110 is one of identification information #1, #2, #3, and #4, the wireless LAN based positioning server 150 is configured to recognize the reference location information of the service provider AP 122, the latitude and longitude coordinate value (X, Y), which is stored in such a manner that respective location information corresponding to each AP identification information (#1, #2, #3, and #4) matches to the reference location information of the service provider AP 122 and the matched respective location information (that is, AP identification information matched with the reference location information) is stored in the database 160, and estimate (or identify), by using (or referring to) the reference location information, the corresponding location information for the location where the terminal 110 is currently camping on. Here, the peripheral wireless LAN radio signal includes a parameter indicating AP identification information corresponding to location information of a certain AP. Meanwhile, although it is described that the wireless LAN based positioning server 150 is also applied to the CDMA and the WCDMA to provide the pCell positioning, it is only for an illustrative description of the technical idea of the present disclosure, and those skilled in the art can make a modification such that the wireless LAN based positioning server 150 is applied to WiBro, Long Term Evolution (LTE) and Evolved Packet Core (EPC) to provide the pCell positioning and then apply the modification, without departing from the scope of the present disclosure.

Meanwhile, when the wireless LAN based positioning server 150 receives only a base station signal instead of the wireless LAN radio signal from the terminal 110, the location of the terminal 110 can be measured using a pCell based positioning server (not shown). That is, the pCell based positioning server is a server for measuring the location of the terminal 110 corresponding to the positioning target by using the database 160. When the location calculating server 140 receives a positioning request signal form the terminal 110, the pCell based positioning server selects from the database 160 a pCell corresponding to the pattern closely matching with PPM data received from the terminal 110, and provides the service requester (i.e., the terminal 110) with the selected pCell as a positioning result. Here, in order to provide the service requester with an accurate positioning result, the database 160 should be always maintained to have the latest data which can better reflect a change in a positioning environment such as a wireless environment at a positioning request time, a positioning system state and the like. In some embodiments, the terminal 110, the service provider AP 122, the AP managing device 130, the location calculating server 140, and/or the wireless LAN based positioning server 150 include(s) one or more network interfaces including, but not limited to, cellular, Wi-Fi, LAN, WAN, CDMA, WCDMA, GSM, LTE and EPC networks, and cloud computing networks. Each of the local cache 200, the terminal 110, the service provider AP 122, the AP managing device 130, the location calculating server 140, and the wireless LAN based positioning server 150, is implemented by one or more processors and/or application-specific integrated circuits (ASICs).

Although it is described that the database 160 is implemented as a separate device from the terminal 110, the AP managing device 130, the location calculating server 140, or the wireless LAN based positioning server 150, the present disclosure is not necessarily limited thereto and the database 160 may be alternatively configured to be included in one or more of the terminal 110, the AP managing device 130, the location calculating server 140, and the wireless LAN based positioning server 150. The database 160 is configured to store one or more lattice cells distinguished by each pCell ID with positioning result data corresponding to a positioning result measured every time as basic data, wherein each lattice cell is matched with the parameter of the wireless LAN radio signal, and then stored therein. That is, the database 160 is configured to divide a positioning service target area in units of lattices having a predetermined size and define each lattice as the pCell to configure the data structure storing the positioning result and wireless LAN environment information for each defined pCell. The database 160 according to at least one embodiment matchingly stores each AP identification information of the peripheral APs #1, #2, #3 and #4 in the latitude and longitude coordinate value (X, Y) which is set by the AP managing device 130 on the basis of the reference location information, the latitude and longitude coordinate value (X, Y) of the service provider AP 122 pre-stored by the AP managing device 130.

Figure 6:
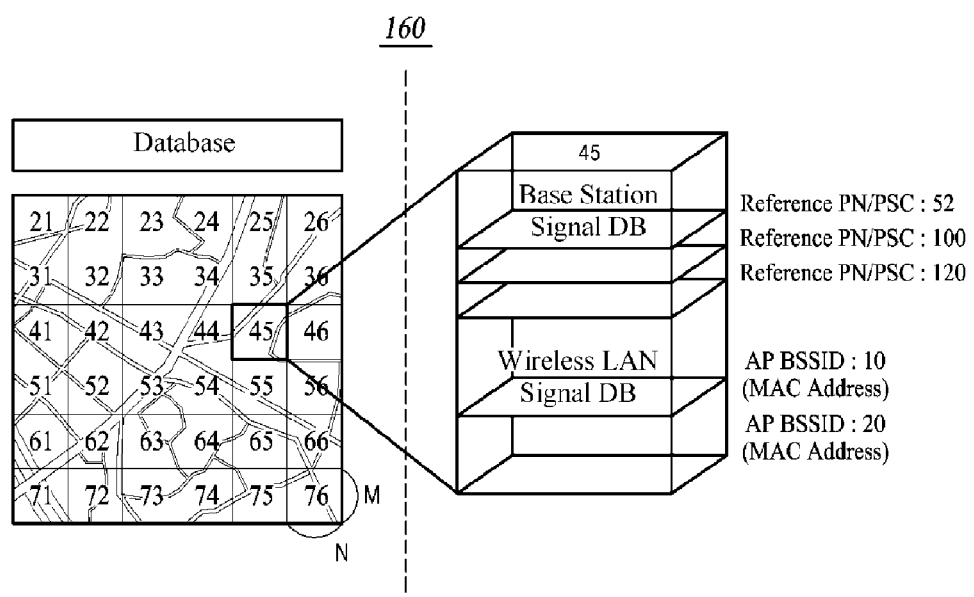
FIG. 6 is a schematic view of an exemplary database structure for one lattice cell 45 among lattice cells according to at least one embodiment.

Here, the lattice cell is a cell having a preset size (e.g. a size of square shape such as one as shown in FIG. 6) divided from a particular area, and includes a base station sector number for a base station located in the particular area and a pCell ID based on the PSC (Primary Scrambling Code). That is, the lattice cell may be set to have a size of N×M. For example, the lattice cell may be set to have a square shape of 100×100, 50×50, 30×30, 25×25, 20×20, 10×10.5×5, 1×1 and the like, but the present disclosure is not necessarily limited thereto and the lattice cell may be set to have various shapes suitable for each environment through an optimization process in the future. Further, the database 160 illustrated in FIG. 1 includes information on a system which is currently serviced, a pilot signal of the adjacent base station, a signal intensity and the like. The information on the system which is currently serviced contains a system ID (hereinafter, referred to as an "SID"), a network ID (hereinafter, referred to as an "NID"), a base station ID (hereinafter, referred to as a "BSID"), a sector number of the base station which is currently serviced (Reference PN, hereinafter, referred to as "Ref_PN"), a pilot phase within the Ref_PN, a signal intensity and the like.

Describing pCell positioning type data stored in the database 160 in detail, the database 160 stores reference data which can represent the basic data, together with the lattice cells distinguished by each pCell ID with positioning result data which is the positioning result measured every time as the basic data. Here, the reference data is data compared when the pattern matching is considered in the pCell positioning. The reference data highly influences positioning accuracy and is updated when the database is updated. In general, in order to update the database, the reference data is updated by calculating an arithmetic mean of newly measured positioning result data and a lot of already stored reference data. Due to such a data update manner, the newly measured positioning result data may be slightly reflected to the reference data. Particularly, when the number of reference data already stored in the database is great, the newly measured positioning result data hardly influences the reference data update although the database is updated.

In order to enable the positioning method to provide a more accurate positioning result, the database should be always updated to be maintained as the latest data. However, due to characteristics of the above-mentioned data updating scheme in a general positioning scheme, a general database update method in the general positioning method may not sufficiently reflect a change in a positioning environment such as a wireless environment, a positioning system state and the like. For example, in a condition where a positioning system or a wireless environment in which the positioning service is executed is continuously and frequently changed, currently measured positioning result data can provide a more accurate positioning result in comparison with the reference data pre-stored in the database in the past. In this event, the reference data stored in the database may adaptively follow the condition where the current positioning environment is changed, by reflecting the currently measured positioning result data with a higher level when the reference data pre-stored in the database is updated.

Meanwhile, describing the wireless LAN signal stored in the database 160 according to one or more embodiments of the present disclosure in detail, the database 160 matchingly stores the lattice cell distinguished by each pCell ID with wireless LAN environment information. Here, the wireless LAN environment information refers to information by which APs for relaying the wireless LAN signal can be identified, and preferably be a MAC address of the AP for relaying the wireless LAN signal but not necessarily limited thereto. Here, the MAC address of the AP is unique information by which the corresponding AP can be identified, and corresponds to the Basic Service Set Identifier (BSSID). The MAC address is assigned a total of 48 bits, and information assigned by a manufacturer is input to 24 bits of the 48 bits. The Service Set Identifier (SSID) is also information by which the corresponding AP can be identified, and indicates a value set by a user. Further, the database 160 according to one or more embodiments of the present disclosure stores a location according to base station identification information. Here, it is preferable that the base station identification information is the base station sector number, but not necessarily limited thereto.

In some embodiments, the database 160 includes one or more computer-readable medium as described herein. The database 160 refers to a general data structure implemented in a storage space (hard disk or a memory) by using a database management program (or Database Management System: DBMS), and a data storage type in which searching (extraction), deletion, editing, addition and the like of the data are freely performed. The database 160 may be implemented to serve the purpose according to one or more embodiments of the present disclosure by using a Relational Database Management System (RDBMS) such as Oracle, Infomix, Sybase, and DB2, an Object Oriented Database Management System (OODBMS) such as Gemston, Orion, O2 and the like, and an XML native database such as Excelon, Tamino, Sekaiju and the like, and has proper fields or elements to achieve its own function.

Figure 2:
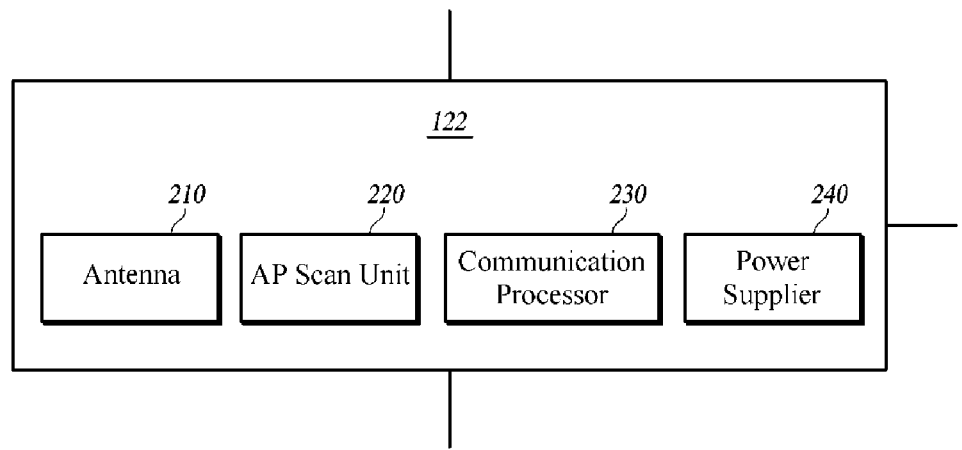
FIG. 2 is a block diagram of a service provider AP according to at least one embodiment.

FIG. 2 is a block diagram of the service provider AP according to at least one embodiment. The service provider AP 122 in configured to include an antenna 210, an AP scan unit 220, a communication processor 230, and a power supplier 240. Of course, although at least one embodiment describes that the service provider AP 122 includes only the antenna 122-1, the AP scan unit 122-2, the communication processor 122-3, and the power supplier 122-4, it is only for an illustrative description of the technical idea of one or more embodiments of the present disclosure and those skilled in the art can make various modifications and changes to the components included in the service provider AP 122 and then apply the modifications and changes, without departing from the scope of the present disclosure. The antenna 210 is configured to emit or receive a radio signal in a particular direction. The AP scan unit 220 is configured to scan the peripheral APs 124 on a regular cycle. The communication processor 230 configured to transmit the peripheral wireless LAN radio signals received from the scanned peripheral APs 124 to the AP managing device. And the power supplier 240 is configured to supply a power. The AP scan unit 220 is configured to scan the peripheral APs 124 when a scan request signal is received form the AP managing device 130. Other components of the service provider AP 122, such as the antenna 210, the AP scan unit 220, the communication processor 230, and the power supplier 240, are implemented by one or more processors and/or application-specific integrated circuits (ASICs).

Figure 3:
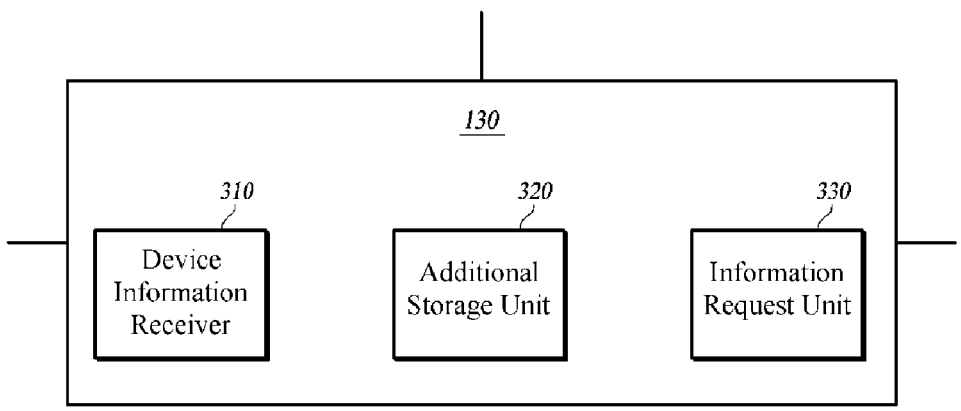
FIG. 3 is a block diagram of an AP managing device according to at least one embodiment.

FIG. 3 is a block diagram of the AP managing device according to at least one embodiment. The AP managing device 130 is configured to include a device information receiver 310, an additional storage unit 320, and an information request unit 330. Of course, although at least one embodiment describes that the AP managing device 130 includes only the device information receiver 310, the additional storage unit 320, and the information request unit 330, it is only for an illustrative description of the technical idea of one or more embodiments of the present disclosure and those skilled in the art can make various modifications and changes to the components included in the AP managing device 130 and then apply the modifications an changes, without departing from the scope of the present disclosure.

The device information receiver 310 is configured to receive one or more peripheral wireless LAN radio signals from the service provider AP 122. Here, each of the peripheral wireless LAN radio signals is information including one or more of the Basic Service Set Identifier (BBSID) corresponding to the MAC address for the corresponding AP, the Service Set Identifier (SSID), and the AP channel information. The additional storage unit 320 stores a parameter (i.e., AP identification information) of each of the peripheral wireless LAN radio signals for each of the lattice cells including the AP identification information corresponding to the parameter of each of the peripheral wireless LAN radio signals as the reference location information. The additional storage unit 320 is configured to store the parameter included in each of the peripheral wireless LAN radio signals in the database 160 immediately upon receiving the peripheral wireless LAN radio signals, or store the parameter included in each of the peripheral wireless LAN radio signals in the database 160 according to a preset regular cycle. The information request unit 330 is configured to transmit the scan request signal to the service provider AP 122, and receive the one or more peripheral wireless LAN radio signals corresponding to the scan request signal through the device information receiver 310. The information request unit 330 is configured to transmit the scan request signal to the service provider AP 122 on the preset regular cycle. Other components of the AP managing device 130, such as the device information receiver 310, the additional storage unit 320, and the information request unit 330, are implemented by one or more processors and/or application-specific integrated circuits (ASICs).

Figure 4:
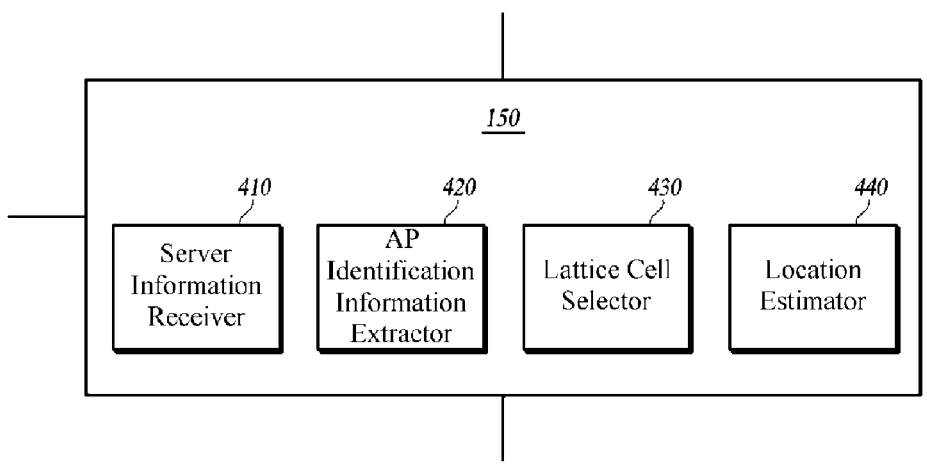
FIG. 4 is a block diagram of a wireless LAN based positioning server according to at least one embodiment.

FIG. 4 is a block diagram of the wireless LAN based positioning server according to at least one embodiment. The wireless LAN based positioning server 150 is configured to include a server information receiver 410, an AP identification information extractor 420, a lattice cell selector 430, and a location estimator 440. Of course, although one or more embodiments of the present disclosure describes that the wireless LAN based positioning server 150 includes only the server information receiver 410, the AP identification information extractor 420, the lattice cell selector 430, and the location estimator 440, it is only for an illustrative description of the technical idea according to one or more embodiments of the present disclosure and those skilled in the art can make various modifications and changes to the components included in the wireless LAN based positioning server 150 and then apply the modifications and changes, without departing from the scope of the present disclosure. The server information receiver 410 is configured to receive one or more signals of the positioning request signal and the wireless LAN radio signal from the terminal 110. The AP identification information extractor 420 is configured to extract AP identification information from the parameter included in the wireless LAN radio signal. The lattice cell selector 430 is configured to select the lattice cell in which the AP identification is matchingly stored as the reference location information by using the database 160. The location estimator 440 is configured to estimate location information of the selected lattice cell as location information of the terminal 110. Other components of the wireless LAN based positioning server 150, such as the server information receiver 410, the AP identification information extractor 420, the lattice cell selector 430, and the location estimator 440, are implemented by one or more processors and/or application-specific integrated circuits (ASICs).

Figure 5:
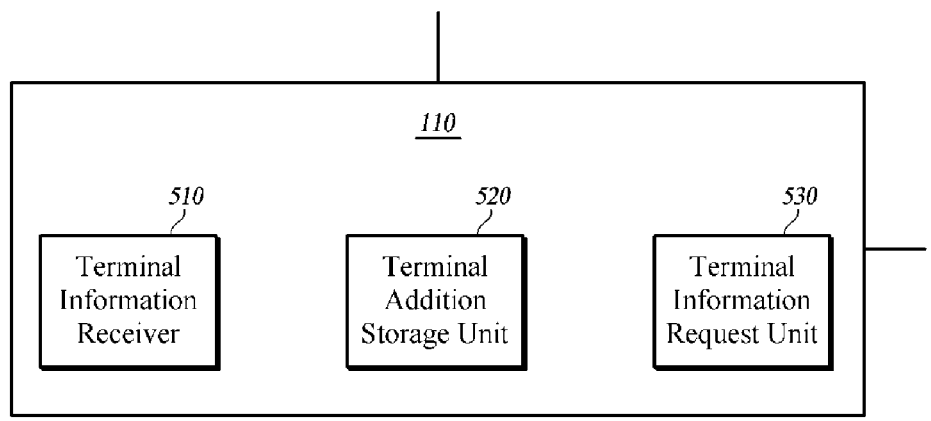
FIG. 5 is a block diagram of a terminal according to at least one embodiment.

FIG. 5 is a block diagram of the terminal according to at least one embodiment. The terminal 110 according to one or more embodiments of the present disclosure includes a terminal information receiver 510, a terminal addition storage unit 520, and a terminal information request unit 530. Of course, although it is described that the terminal according to one or more embodiments of the present disclosure includes only the terminal information receiver 510, the terminal addition storage unit 520, and the terminal information request unit 530, it is only for an illustrative description of the technical idea according to one or more embodiments of the present disclosure and those skilled in the art can make various modifications and changes to the components included in the terminal 110 and then apply the modifications and changes, without departing from the scope of the present disclosure. The terminal information receiver 510 is configured to receive the peripheral wireless LAN radio signal from the service provider AP 122. The terminal addition storage unit 520 is configured to store the parameter of the peripheral wireless LAN radio signal for each of the lattice cells including AP identification information corresponding to the parameter of the peripheral wireless LAN radio signal as the reference location information. The terminal addition storage unit 520 is configured to store the parameter included in the peripheral wireless LAN radio signal immediately upon receiving the peripheral wireless LAN radio signal in the database 160 or stores the parameter included in the peripheral wireless LAN radio signal in the database 160 according to a preset regular cycle. The terminal information request unit 530 is configured to transmit the scan request signal to the service provider AP 122, and receives the peripheral wireless LAN radio signal corresponding to the scan request signal through the device information receiver 310. The terminal information request unit 530 is configured to transmit the scan request signal to the service provider AP 122 on the preset regular cycle. Other components of the terminal 110, such as the terminal information receiver 510, the terminal addition storage unit 520, and the terminal information request unit 530, are implemented by one or more processors and/or application-specific integrated circuits (ASICs).

FIG. 6 is a schematic view of an exemplary database structure of one cell 45 among lattice cells according to at least one embodiment.

The database 160 in FIG. 6 is configured to divide a positioning service target area in units of one or more lattice cells having a preset size, and is configured as a database for storing a wireless LAN radio environment collected for each lattice cell. The lattice cell shown in FIG. 6 corresponds to a cell having a preset size divided from a particular area. That is, the lattice cell may be set to have a size of N×M. For example, the lattice cell may be set to have a square shape of 100×100, 50×50, 30×30, 25×25, 20×20, 10×10.5×5, 1×1 and the like, but the present disclosure is not necessarily limited thereto and the lattice cell may be set to have various shapes suitable for each environment through the optimization process in the future.

Further, the database 160 is configured to store one or more corresponding information, matching to and per each lattice cell, such as identification information of the peripheral APs for transmitting the one or more wireless LAN radio signals, MAC address information to each divided lattice cell, reception signal intensity information, frequency information, and location estimation information of the AP, as shown in FIG. 6. Of course, when the database 160 is configured to obtain one or more of latitude information, longitude information, and altitude information corresponding to accurate location information on a location where each of the peripheral APs is installed, through an external server, the database 160 can update the location estimation information of each of the peripheral APs to the accurate location information on the location where each of the peripheral APs is installed. For example, the database 160 is configured to store respective identification information #1, #2, #3 and #4 corresponding to each of the first peripheral AP #1, the second peripheral AP #2, the third peripheral AP #3, and the fourth peripheral AP #4 which are the peripheral APs 124 in the latitude and longitude coordinate value (X, Y) which is location information of the service provider AP 122 pre-stored by the AP managing device 130.

The database 160 refers to a data structure implemented in a storage space (hard disk or a memory) by using a database management program (or Database Management System: DBMS), and a data storage type in which searching (extraction), deletion, editing, addition and the like of the data are freely performed. The database 160 may be implemented to serve the purpose according to one or more embodiments of the present disclosure by using a Relational Database Management System (RDBMS) such as Oracle, Infomix, Sybase, and DB2, an Object Oriented Database Management System (OODBMS) such as Gemston, Orion, O2 and the like, and an XML native database such as Excelon, Tamino, Sekaiju and the like, and has proper fields or elements to achieve its own function.

Figure 7:
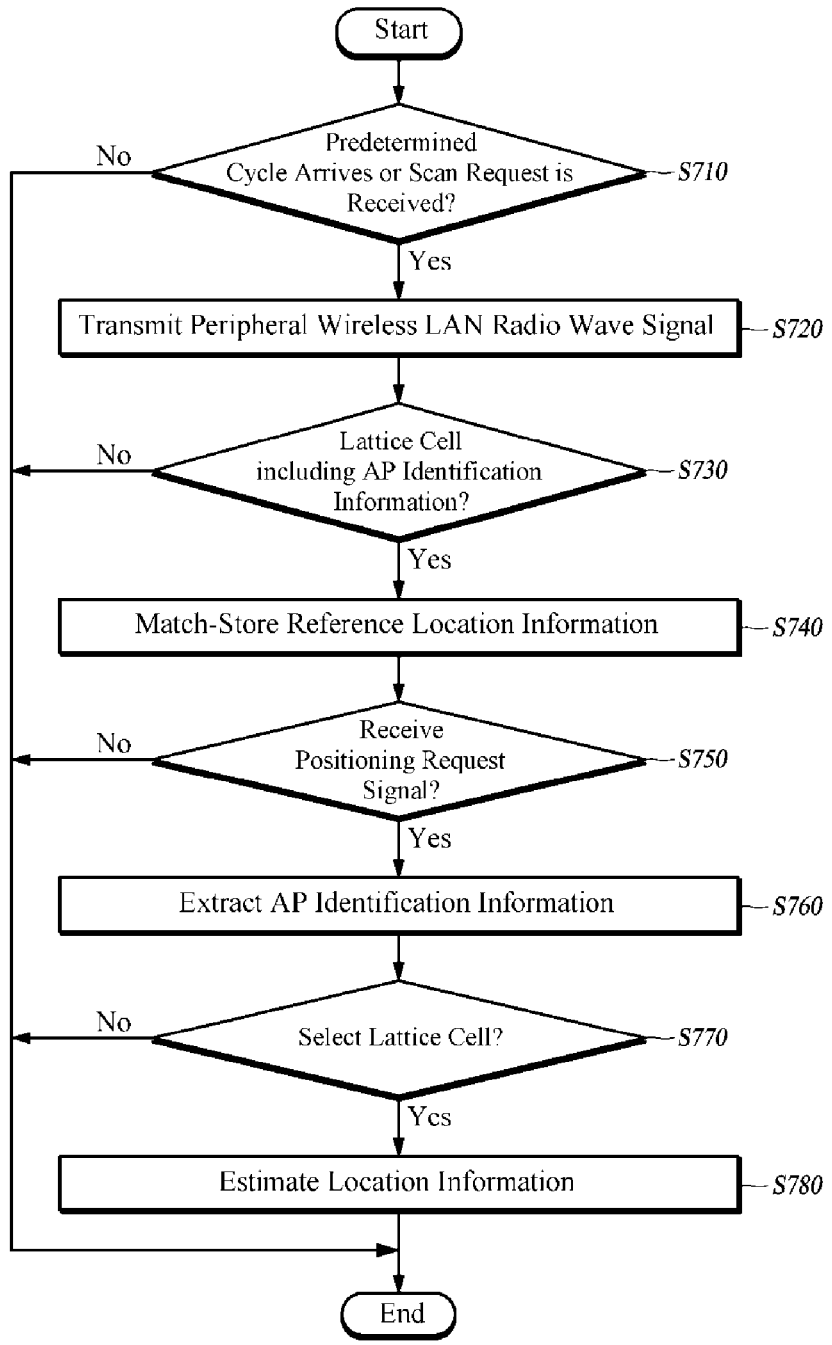
FIG. 7 is a flowchart of a method of providing a positioning service by managing a peripheral wireless LAN signal according to at least one embodiment.

FIG. 7 is a flowchart of a method of providing a positioning service by managing a peripheral wireless LAN signal according to at least one embodiment.

The service provider AP 122 identifies whether a preset regular cycle arrives or a scan request signal is received from the AP managing device 130 in step S710. When the preset regular cycle arrives or the scan request signal is received from the AP managing device 130 as a result of the identification in step S710, the service provider AP 122 scans the peripheral APs 124, and transmits peripheral wireless LAN radio signals received from the scanned peripheral AP 124s to the AP managing device 130 in step S720. That is, the service provider AP 122 scans the peripheral APs 124 on a regular cycle, and transmits the peripheral wireless LAN radio signals received from the scanned peripheral APs 124 to the AP managing device 130. Meanwhile, when the service provider AP 122 receives the scan request signal from the AP managing device 130, the service provider AP 122 scans the peripheral APs 124. That is, peripheral wireless LAN radio signals scanned by the service provider AP 122 are collected.

The AP managing device 130 identifies whether there is a lattice cell including AP identification information corresponding to a parameter of each peripheral wireless LAN signals received from the service provider AP 122 by using the database 160 in step S730. If there is the lattice cell including the AP identification information as a result of the identification in step S730, the AP managing device 130 stores AP identification information corresponding to the parameter of each of the peripheral wireless LAN radio signals for the corresponding lattice cell, in such a manner that respective location information corresponding to each AP identification information matches to the reference location information of the service provider AP 122 and the matched respective location information (that is, AP identification information matched with the reference location information) is stored in the database 160, in step S740. That is, the AP managing device 130 stores each lattice cell distinguished by each cell ID, and may include the stand alone database for storing the wireless LAN radio signal for each of lattice cells. When the AP managing device 130 receives the peripheral wireless LAN radio signal from the service provider AP 122, the AP managing device 130 stores the parameter (i.e., corresponding AP identification information) of the peripheral wireless LAN radio signal for each of the lattice cells in the above mentioned manner. Meanwhile, the AP managing device 130 transmits the scan request signal to the service provider AP 122, and receives the peripheral wireless LAN radio signal from the service provider AP 122 in response to the scan request signal. The AP managing device 130 alternatively transmits the scan request signal to the service provider AP 122 on the preset regular cycle. The AP managing device 130 stores the parameter (i.e., corresponding AP identification information) included in the peripheral wireless LAN radio signal in the database 160 immediately upon receiving the peripheral wireless LAN radio signal or according to the preset regular cycle.

The wireless LAN based positioning server 150 identifies whether a positioning request signal is received from the terminal in step S750. When the positioning request signal is received from the terminal 110 as a result of the identification in step S750, the wireless LAN based positioning server 150 extracts the AP identification information from the parameter included in the peripheral wireless LAN radio signal received from the terminal 110 in step S760. The wireless LAN based positioning server 150 selects (or determines) from the database 160 the corresponding lattice cell including the extracted AP identification which is matched to the reference location information of the service provider AP 122, in step S770. The wireless LAN based positioning server 150 estimates location information of the selected corresponding lattice cell as location information for the location on which the terminal 110 is currently camping in step S780. That is, the wireless LAN based positioning server 150 receives at least one of the positioning request signal and at least one wireless LAN radio signal from the terminal 110, extracts the AP identification information from the parameter included in the at least one wireless LAN radio signal, selects the lattice cell matching to one of the AP identification information of peripheral wireless LAN radio signals from the database 160, and determines the location information of the selected lattice cell as location information for the location on which the terminal 110 is currently camping.

Although it is described that steps S710 to S780 are sequentially executed in FIG. 7, it is only for an illustrative description of the technical idea according to at least one embodiment and those skilled in the art can make various modifications and changes such that the order described in FIG. 7 is changed and then executed, or one or more of steps S710 to S780 are executed in parallel, so that FIG. 7 of the present disclosure is not limited to a time-series order.

According to at least one embodiment as described above, peripheral wireless LAN radio signals, which scanned by a service provider AP, is collected and then the collected peripheral wireless LAN radio signals are stored in a database, so that the stored peripheral wireless LAN radio signals are used for measuring a location of a terminal. Alternatively, at least one peripheral AP periodically transmits a peripheral signal to a server in the system of providing a positioning service in accordance with the least one embodiment, by scanning the at least one peripheral signal to select a channel having low interference, so that the at least one peripheral AP may be detected based on location information of the at least one peripheral AP storing its location information. Moreover, according to at least one embodiment, a database of a corresponding in-building area may be automatically collected by using information on the at least peripheral AP detected based on the at least one peripheral AP storing its location information for wireless LAN based positioning.

As described above, the managing of the peripheral wireless LAN radio signals and the providing of a positioning service according to at least one embodiment of the present disclosure described in FIG. 7 may be recorded in any non-transitory, a computer-readable recording medium implemented in the form of one or more programs. A computer-readable recording medium for implementing the various embodiments of the present disclosure includes a program command, a data file, a data structure, etc. alone or in combination and all types of recording devices for storing data readable by computer systems. An example of the computer-readable recording medium includes a ROM, a RAM, a CD-ROM, a magnetic tape, a floppy disk, an optical data storage device and the like. Further, the computer-readable recording medium may be distributed over the computer systems connected via a network to store and execute a code readable by the computer in a distributed manner. In addition, a functional program, a code, code segments for implementing at least one embodiment of the present disclosure may be easily deduced by one skilled in the art. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure. The computer readable media may include magnetic recording media, optical recording media, and carrier signal media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from the subject matter and scope of this disclosure. Therefore, exemplary embodiments of the present disclosure have not been described for limiting purposes. Accordingly, the scope of the disclosure is not to be limited by the above embodiments but by the claims and the equivalents thereof.

What is claimed is:

1. An apparatus for managing one or more access points (APs), the apparatus comprising:
   an information receiver configured to receive one or more peripheral wireless local area network (LAN) radio signals from a service provider AP, wherein the service provider AP is located at a preset location in lattice cells, and the one or more peripheral wireless LAN radio signals are scanned by the service provider AP; and
   an additional storage unit configured to
     match individual cell IDs of the lattice cells with AP identification information of each of the one or more peripheral wireless LAN radio signals for each of lattice cells, and store (i) information of the matched lattice cell and (ii) the AP identification information of each of the one or more peripheral wireless LAN radio signals in a database, wherein the lattice cells are identified by corresponding individual cell IDs and the AP identification information is stored by using location information of the service provider AP as reference location information.

2. The apparatus of claim 1, further comprising:
an information request unit configured to:
transmit a scanning request signal to the service provider AP, and
receive the one or more peripheral wireless LAN radio signals through the information receiver in response to the scanning request signal.

3. The apparatus of claim 2, wherein the information request unit is configured to transmit the scanning request signal to the service provider AP on a preset regular cycle.

4. The apparatus of claim 1, wherein the additional storage unit is configured to store the AP identification information upon receiving the one or more peripheral wireless LAN radio signals in the database or stores the AP identification information in the database according to a preset regular cycle.

5. The apparatus of claim 1, wherein the AP identification information includes one or more of a basic service set identifier (BBSID) corresponding to a MAC address of a corresponding AP, a service set identifier (SSID), and AP channel information.

6. The apparatus of claim 1, further comprising:
an information extractor configured to extract AP identification information from a wireless LAN radio signal received from a terminal, when a positioning request signal is received from the terminal; and
a selector configured to select from database a corresponding lattice cell matching to the stored AP identification information of each of the peripheral wireless LAN radio signals stored as the reference location information by using the extracted AP identification information.

7. The apparatus of claim 6, further comprising:
a location estimator configured to estimate location information of the selected lattice cell as location information of the terminal.

8. A method of providing a position service by a positioning service system, the method comprising:
receiving one or more peripheral wireless local area network (LAN) radio signals from a specific access point (AP), wherein the specific AP is located at a preset location in lattice cells, and the one or more peripheral wireless LAN radio signals are scanned by the specific AP;
matching individual cell IDs of the lattice cells with AP identification information of each of the one or more peripheral wireless LAN radio signals for each of lattice cells;
storing (i) information of the matched lattice cell and (ii) the AP identification information of each of the received peripheral wireless LAN radio signals in a database by using the location of the specific AP as reference location information;
identifying whether a positioning request signal is received from a terminal;
extracting AP identification information included in a peripheral wireless LAN radio signal received from the terminal when the positioning request signal is received from the terminal; and
selecting from the database, using the extracted AP identification information, a corresponding lattice cell matching to the stored AP identification information of each of the peripheral wireless LAN radio signals.

9. The method of claim 8, further comprising
estimating location information of the selected corresponding lattice cell as location information for the location on which the terminal is currently camping.

10. The method of claim 8, wherein the receiving further comprising
transmitting to the specific AP a scanning request signal for one or more peripheral APs; and
receiving from the specific AP the one or more peripheral wireless LAN radio signals of the scanned one or more peripheral APs in response to the scanning request signal.

11. The method of claim 8, wherein the storing comprises
storing in the database the AP identification information of each of the received peripheral wireless LAN radio signals with the location of the specific AP.

12. A positioning service system for providing a position service, the system comprising:
an access point (AP) managing device configured to
receive one or more peripheral radio signals from a specific AP, wherein the specific AP is located at a preset location in lattice cells, the one or more peripheral radio signals are scanned by the specific AP,
matching individual cell IDs of the lattice cells with AP identification information of each of the one or more peripheral wireless LAN radio signals for each of lattice cells, and
store in a database (i) information of the matched lattice cell and (ii) the AP identification information of each of the received peripheral radio signals by using the location of the specific AP as reference location information; and
a positioning server configured to
receive a positioning request signal including at least one radio signal from a terminal,
extract AP identification information from the at least one radio signal from the terminal,
select from the database a corresponding lattice cell matching to the extracted AP identification information by using (i) the stored information of the matched lattice cell and (ii) the stored AP identification information, and
estimate location information of the selected lattice cell as the location information for the location on which the terminal camps.

13. The system of claim 12, further comprising:
the specific AP configured to:
scan the one or more peripheral APs in response to a scan request signal or according to a preset cycle, and
transmit the one or more peripheral radio signals of the scanned one or more peripheral APs to the AP managing device.

14. The system of claim 13, wherein the AP managing device is configured to:
transmit the scan request signal to the specific AP, and
receive from the specific AP the one or more peripheral radio signals of the peripheral APs in response to the scan request signal.

15. The system of claim 12, wherein the database is configured to store one or more lattice cells each identified by a cell ID, wherein each of the one or more lattice cells stores AP identification information of each of the received peripheral radio signals.

16. The system of claim 15, wherein the AP identification information of each of the received peripheral radio signals is included in a parameter of each of the received peripheral radio signals.

17. The system of claim 16, wherein the AP identification information includes a latitude and longitude coordinate value.

* * * * *